Patented Oct. 4, 1932

1,880,265

UNITED STATES PATENT OFFICE

HENRY S. MARSH AND CARL W. WEESNER, OF YOUNGSTOWN, OHIO, ASSIGNORS TO SHARON STEEL HOOP COMPANY, OF SHARON, PENNSYLVANIA, A CORPORATION OF PENNSYLVANIA

PROCESS OF MAKING SOLUBLE FERRIC SULPHATE

No Drawing.   Application filed May 29, 1929.   Serial No. 367,115.

The present invention relates to a process of producing soluble ferric sulphate. It can be utilized to advantage in producing soluble ferric sulphate from ferrous sulphate. Ferric sulphate may exist in either the anhydrous state which is difficultly soluble, or in the readily soluble state in which the ferric sulphate crystals contain water of crystallization. The general formula for the soluble ferric sulphate is $Fe_2(SO_4)_3 \cdot XH_2O$.

The amount of water of crystallization is variable. The soluble ferric sulphate may be substantially neutral or it may contain some sulphuric acid in combination as an acid ferric sulphate. The ferric sulphate may be produced from ferrous sulphate by heating the ferrous sulphate under oxidizing conditions to form a dry mass consisting of ferric sulphate and ferric oxide, as described in our copending application Serial No. 326,151, filed Dec. 14, 1928. As described in said application, this mass is treated with sulphuric acid and water which converts the ferric oxide into ferric sulphate, and then is heated to dryness. The ferric sulphate as obtained by this method is in the anhydrous state. The anhydrous ferric sulphate is difficultly soluble.

For many industries, it is desirable to have ferric sulphate in the soluble form. The purpose of the present process is to form ferric sulphate in a soluble form.

The preferred material to be used is well known ferrous sulphate or "copperas" which is usually obtainable in the crystalline form, containing water of crystallization. The ferrous sulphate containing the water of crystallization is heated to a temperature sufficient to drive off the water of crystallization and render the crystals substantially anhydrous. This may be accomplished by heating to a temperature of not less than 300° F. and preferably, by heating to a temperature of 450° F. This heating, which renders the crystals substantially anhydrous, produces a very friable material which can be easily crushed. This friable material is then finely divided by any grinding means, as for example, by crushing it between two steel rollers having smooth surfaces. It is preferable to grind the material to a size such that it will pass through a sieve having sixty meshes to the inch. The ground ferrous sulphate is then heated under oxidizing conditions to a temperature sufficient to convert it into ferric sulphate and ferric oxide. This may be accomplished by heating it in a rotary furnace of the open muffle type to a temperature of about 850 to 1000° F. If temperatures over 1000° F. are employed, the ferric sulphate tends to decompose resulting in the formation of an excess quantity of ferric oxide. If temperatures below about 850° F. are employed, some ferrous sulphate will remain unconverted.

The material discharged from the rotary kiln contains about 80% anhydrous ferric sulphate and about 20% ferric oxide, the ferric oxide having been formed during the heating step in which the material within the kiln had access to the oxygen of the air. This material is of a powdery or fine granular consistency. The reddish brown color is due to the presence of the ferric oxide. The material is then treated to convert it into soluble ferric sulphate as follows:

According to our present preferred process, we mix the brownish red mixture of ferric sulphate and ferric oxide discharged from the rotary kiln with 60° Baumé sulphuric acid. This mixture is kept in a moisture saturated atmosphere maintained at a temperature of about 125° F. until all of the ferric oxide and ferric sulphate are converted into soluble ferric sulphate. We have found that the amount of 60° Baumé sulphuric acid added to each pound of the brownish red material can be varied from 88 to 400 cubic centimeters. In case the maximum amount of acid is used, not all of it, so far as we know, is in combination with the soluble ferric sulphate, the excess acid being mechanically held thereby.

The final product is the soluble ferric sulphate containing usually about three molecules of water to each molecule of ferric sulphate. The ferric sulphate thus obtained is readily soluble and is in the condition desired in many industries. By suitably proportioning the acid, the soluble ferric sulphate may be obtained in a substantially neutral form, or by adding an excess of acid, the ferric sulphate may be obtained as an acid ferric sulphate which is the form desired for some purposes, for example, sewage treatment. Both the neutral and the acid ferric sulphate as thus formed are readily soluble.

For some uses such as in the treatment of sewage it is preferred to use acid ferric sulphate rather than neutral ferric sulphate. If neutral ferric sulphate is dissolved in water, some of the iron separates out in a basic form which gives a brown colored solution. If the sulphate is slightly acid, the basic iron does not form but on the contrary the sulphate can be dissolved in a clear solution. Only a slight amount of acid is necessary to produce such a clear solution. For example, if neutral soluble ferric sulphate is dissolved in water, thereby resulting in a brown solution, it is necessary to add only a few drops of acid in order to clear the solution.

Throughout the specification we have referred to the use of sulphuric acid and water for the conversion of insoluble anhydrous ferric sulphate to soluble ferric sulphate. It is to be understood that instead of using sulphuric acid per se, any suitable material containing a sulphate radical may be used in its place. In our preferred procedure, the water is present in the form of moisture in a moisture saturated atmosphere.

We have described the present preferred manner of practicing our invention. The invention, however, is not limited to the method described, but may be practiced within the scope of the following claims.

We claim:

1. The process of making soluble ferric sulphate from material containing anhydrous ferric sulphate and ferric oxide, which comprises treating such material with sulphuric acid in a moisture saturated atmosphere at a temperature of about 125° F.

2. The process of making soluble ferric sulphate from material containing anhydrous ferric sulphate and ferric oxide, which comprises treating such material with sulphuric acid in a moisture saturated atmosphere at a temperature of about 125° F. the amount of acid used being equivalent to between 88 and 400 cubic centimeters of 60° Baumé acid per pound of said material.

3. The process of making soluble ferric sulphate, comprising heating ferrous sulphate in air to a temperature of 850–1000° F. to convert it into a mixture of ferric sulphate and ferric oxide, and treating the mixture with sulphuric acid in a heated moisture saturated atmosphere at a temperature of about 125° F.

In testimony whereof we have hereunto set our hands.

HENRY S. MARSH.
CARL W. WEESNER.